United States Patent [19]

Sorimachi et al.

[11] 3,903,529
[45] Sept. 2, 1975

[54] EXPOSURE VALUE CONTROLLING APPARATUS

[75] Inventors: Kanehiro Sorimachi; Tadashi Ito, both of Yokohama; Mitsutoshi Ogiso, Kawasaki, all of Japan

[73] Assignee: Canon Kabushiki Kaisha, Tokyo, Japan

[22] Filed: Dec. 13, 1972

[21] Appl. No.: 314,752

Related U.S. Application Data

[63] Continuation-in-part of Ser. No. 78,391, Oct. 6, 1970.

[30] Foreign Application Priority Data

Oct. 9, 1969 Japan............................ 44-080975
Oct. 9, 1969 Japan............................ 44-080976
Oct. 9, 1969 Japan............................ 44-080977
Nov. 24, 1969 Japan............................ 44-094527

[52] U.S. Cl. ...................... 354/38; 354/43; 354/51
[51] Int. Cl. ............................................. G03b 7/08
[58] Field of Search......... 95/10 CE, 10 CT, 10 CD, 95/53.3; 354/38, 43, 51

[56] References Cited
UNITED STATES PATENTS
3,721,167 3/1973 Ogiso............................ 95/10 CT
3,726,200 4/1973 Ogiso et al...................... 95/10 CT

*Primary Examiner*—Samuel S. Matthews
*Assistant Examiner*—Russell E. Adams, Jr.
*Attorney, Agent, or Firm*—Fitzpatrick, Cella, Harper & Scinto

[57] ABSTRACT

An electronic exposure controlling apparatus for use in cameras having a capacitor to be charged through a first resistive circuit from a voltage source in association with the depression of a shutter release. A switching circuit effects switching action when the charge of the capacitor comes to a predetermined value. A shutter of a shutter mechanism is opened in response to the switching action of the switching circuit and a switch connects the capacitor to a second resistive circuit, including a photoconductive element, in synchronism with the opening of the shutter so as to discharge the capacitor. The switching circuit actuates the closing of the shutter when the capacitor discharges to a predetermined value.

5 Claims, 16 Drawing Figures

|  | M1 | M2 |
|---|---|---|
| BEFORE ACTVATION | off | off |
| S1 on | off | on |
| AFTER S2 OFF | on | off |
| AFTER SWITCHED TO S3b | off | on |

EXPOSURE VALUE CONTROLLING APPARATUS

This application is a continuation-in part of our co-pending application Ser. No. 78,391 filed Oct. 6, 1970, entitled AN EXPOSURE VALUE CONTROLLING APPARATUS.

The present invention relates to an electronic shutter device for use in photographic cameras and more particularly to an electronic shutter device of the type having two time constant circuits using one common capacitor so as to actuate or control the structural parts of the camera by utilizing a charging circuit of the capacitor and to actuate or control other structural parts of the camera by utilizing a discharge circuit of the capacitor.

More specifically this invention relates to an exposure value controlling apparatus in which an aperture device for the objective lens having an aperture variable with the lapse of time starts to operate on the depression of the shutter release button; the control of the operating time of the aperture device is effected by utilizing the time constant of an R-C circuit including resistive means for setting at least shutter speed; after the aperture is set at a value corresponding to the operating time period, the shutter mechanism is actuated; the control of the operating time period of the shutter mechanism is effected by utilizing the time constant of an R-C circuit which is formed by connecting the capacitor (This capacitor has been charged up to a predetermined level during controlling the aperture.) to a discharge circuit including at least a photoresistive element receiving a light coming from an object to be photographed and members for setting information on the above-determined aperture value.

In addition, this invention relates to an exposure value controlling apparatus in which an aperture device for the objective lens having an aperture variable with the lapse of time starts to operate on the depression of the shutter release button; the control of the operating time of the aperture device is effected by utilizing the time constant of an R-C circuit including a resistor for setting at least information on an objective-distance; after the aperture is set at a value corresponding to the operating time period, the shutter mechanism is actuated; the control of the operating time period of the shutter mechanism is effected by utilizing the time constant of an R-C circuit which is formed by connecting the capacitor (This capacitor has been charged up to a predetermined level during controlling the aperture.) to a discharge circuit including resistive means for setting a shutter speed for flash photographing (e.g. 1/60 sec.).

Furthermore, this invention relates to an exposure value controlling apparatus in which a capacitor in an R-C circuit including at least a photoresistive means starts to be charged on the depression of the shutter release button; an indicator is actuated until the voltage across the capacitor reaches predetermined value (It may be considered by the indicating time period whether or not the intensity of light coming from the object is sufficient for photographing.); upon the completion of the charging up to a predetermined value, the capacitor is connected to a discharge circuit including resistive means for setting a shutter speed; the shutter speed control is effected by utilizing the time constant of an R-C circuit including the resistive means for setting a shutter speed and the capacitor.

Heretofore, electronic shutter devices for actuating or controlling two structural parts of a camera, comprised two electronic circuits or a complex selection switch construction.

Furthermore, there is an application for patent in U.S.A. (Ser. No. 872,030) entitled "Exposure Value Controlling Apparatus", the inventor of which is MITSUTOSHI OGISO who is one of the inventor of this invention.

In the OGISO invention one common capacitor may be used both in charging and discharging circuits because of the provision of a selection switch or switches which are simple in construction. Therefore, two structural parts of a camera may be independently actuated or controlled by different charging and discharging characteristics or time constants of the charging and discharging circuits. In the OGISO, there is disclosed an exposure value controlling apparatus wherein a capacitor in an R-C time constant circuit is charged through a first resistive means having a resistance value corresponding to the present shutter speed; a stop value is determined in response to the time required for the voltage across the capacitor to reach a predetermined value; after the determination of the stop value, shutter mechanism is actuated; simaltaneously, the capacitor is connected to a discharge circuit including resistive means by switching means (A selected shutter speed is set on this resistive means.); when the voltage across the capacitor reaches a predetermined value, the shutter is closed.

This invention is concerned with an improvement in the above mentioned apparatus more particularly with an apparatus wherein, in case that an unoptimum shutter speed is set at the resistive means (including photoreceiving element) in the charge circuit, the shutter speed may be corrected, when discharging, in response to the intensity of the light coming from the object.

In addition, this invention is concerned with an apparatus wherein information on an objective distance is set at a resistive means in a charge circuit; a stop value is set at a value in response to the objective distance; the shutter speed is controlled when discharging.

Furthermore, this invention is concerned with an apparatus, wherein a photoreceiving element is used as resistive means for charging; the time required for the voltage across the capacitor reach a predetermined value is in response to the intensity of the light coming from the object; it may be indicated by utilizing the period of the charging time whether usual photographing may be conducted; the shutter speed is controlled during discharging.

One of the objects of the present invention is to provide an electronic shutter device for controlling or actuating two structural parts of a camera.

Another object of the present invention is to provide an electronic shutter in which a stop value is determined in response to a pre-set shutter speed by utilizing the charging characteristic of the time constant or R-C circuit and then a capacitor is switched to the discharge circuit including at least a photoreceiving element receiving a light coming from an object to be photographed and members for setting information on the above-determined aperture value so that the exposure may be made at speed in response to the light intensity during photographing and to said pre-determined stop value.

Another object of the present invention is to provide an electronic shutter for controlling a stop value for a flash exposure by utilizing the charging characteristic of a capacitor and for controlling shutter delay times by utilizing the discharge characteristic of the capacitor.

Another object of the present invention is to provide an electronic shutter of the type which may be used for EE followed shutter speed, programmed exposure and Flash-Auto photography by suitably switching the charging circuits of the capacitor and which actuates or controls by utilizing the discharge characteristics of the capacitor and the structural parts of the camera.

Another object of the present invention is to provide an electronic shutter which indicates a shutter speed in instances of charging and controls the shutter in instances of discharge.

The present invention will become more apparent from the following description of the preferred embodiments thereof taken in conjunction with the accompanying drawings in which.

Figure 1:
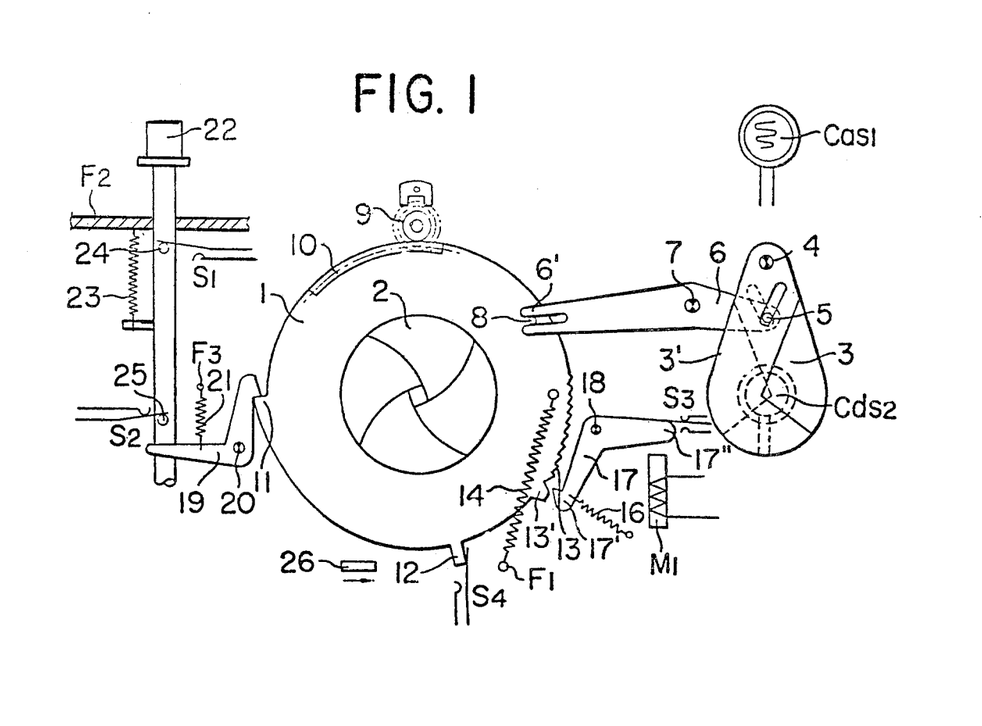
FIG. 1 is a schematic view illustrating the structural parts of a first embodiment of the present invention, the parts being shown as being ready for photography.
Figure 2:
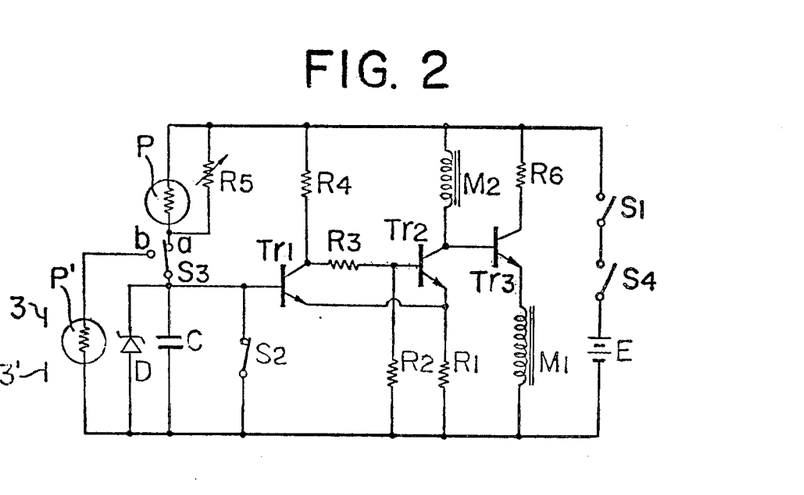
FIG. 2 is a circuit diagram of the first embodiment ready for photography.

FIRST EMBODIMENT, FIGS. 1 and 2

Referring to FIG. 1, reference numeral 1 designates an aperture setting ring, a shutter ring (not shown) being placed forwardly or backwardly of the aperture setting ring 2, aperture blades; and 3 and 3', aperture blades placed forwardly of a second photoconductive element to be described hereinafter and adapted to rotate about a shaft 4 by a pin 5 extending from a connecting lever 6. A bifurcated end 6' of the connecting lever 6 engages a pin 8 extending from the aperture setting ring 1 of a picture taking lens. The lever 6 rotates about a shaft 7 in response to the rotation of the aperture setting ring 1. A delay member 9 is in engagement with teeth 10 formed along a portion of the periphery of the aperture setting ring 1. A pawl member 19 is in engagement with a projection 11 on the aperture ring 1 so that the ring 1 may be held in stationary position against the forces of a spring 14 loaded between the ring 1 and a camera body at $F_1$. The aperture ring 1 is rotated in a counterclockwise direction in the conventional manner when the reciprocating ring charging member 26 advances in the direction indicted by the arrow in response to the film advancing operation so as to push a projection 12 on the aperture ring 1. The projection 12 may serve to make and break a switch $S_4$. Saw teeth 13 are formed along a portion of the periphery of the aperture setting ring 1 for engagement with a pawl 17' of a lever 17 when the latter rotates in a clockwise direction about a shaft 18 under the action of an electromagnet $M_1$ to be described in more detail hereinafter, so tht the rotation in the clockwise direction of the aperture setting ring 1 may be prevented. The lever 17 is biased by a spring 16 so as to rotate in the counterclockwise direction. The opposite end 17'' of the lever 17 changes over a switch $S_3$ when the lever 17 rotates in the clockwise direction. A projection 13' at one end of the saw teeth 13 serves to release the lever 17 from the magnet $M_1$ by an overcharge of the aperture setting ring 1 in the counterclockwise direction by the charging member 26.

A shutter button 22 having pins 24 and 25 is normally biased upwardly to its non-operative position under the force of a spring 23 loaded between the shutter button 22 and the camera body at $F_2$. The pin 24 serves to make and break a switch $S_1$ while the pin 25 also serves to make and break a switch $S_2$. The pin 25 is also adapted to engage lever 19 which is biased to rotate about a shaft 20 in a clockwise direction under the force of a spring 21 loaded between the lever 19 and the camera body at $F_3$. Another arrangement is possible in which one of the pins 24 or 25 is eliminated and the remaining pin may make and break both of the switches $S_1$ and $S_2$.

$CdS_1$ is a first photoconductive element receiving the light coming from the object, which will be hereinafter described in detail. In this embodiment, photoconductive elements $CdS_1$ and $CdS_2$ are employed as light receiving elements, however, it may be apparent that photovoltaic elements may be employed.

Figure 8:
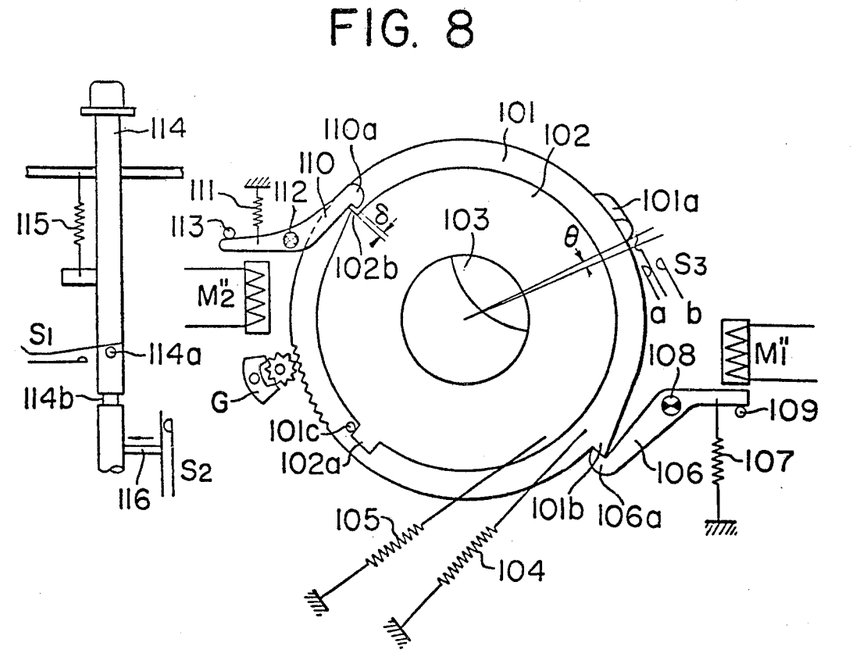
FIG. 8 is a schematic view illustrating the structural parts of a third embodiment of the present invention.

Referring to FIG. 2, there are provided two photoconductive elements P and P' as first and second resistors which constitute, in combination with a capacitor C, charging and discharging circuits. A variable resistor $R_5$ is connected in parallel with the photoconductive element P. A shutter speed which is appeared to be optimum or is desired is set at the variable resitor $R_5$. A charging side terminal is designated by a while a discharging side terminal is designated by b. A constant voltage element D such as Zener diode is provided in order to control the charging voltage at a predetermined level and the discharge voltage when a shutter timer is actuated. $T_1$ and $T_2$ are transistors in a Schmidt circuit and resistors $R_1$ to $R_4$ are provided which are preferably adjustable so that the effect of ASA sensitivity, etc. may be eliminated. A magnet $M_2$ serves to release a second shutter blind in cameras having a focal plane shutter and to cause the opened shutter blades to close in cameras having a lens shutter. However, if the magnet $M_2$ is energized before actuation of the magnet $M_1$, the shutter mechanism in fact, does not receive an adverse effect therefrom, because a first shutter blind, in the case of a focal plane shutter, or an opening ring, in the case of a lens shutter, is usually constructed to engage with a second shutter blind or a closing ring, respectively, for restricting the movement thereof. Accordingly, the shutter is not closed, even if the magnet $M_2$ is energized, until the shutter is opened by means of the magnet $M_1$ to the desired value. As shown in FIG. 8, the first ring 102, or shutter closing ring, has a projection 102a which engages a pin 101C mounted on the first ring, or shutter opening ring. The switch $S_2$ is an integrating start switch of the time constant circuit including the photoconductive element P, a variable resistor $R_5$ and a capacitor C. The shutter does not begin to open even when the switch $S_2$ is opened. The switch $S_2$ is a start switch used in case of setting a stop by the shutter button 22. The magnet $M_1$ stops the rotation of the aperture ring in order to determine a stop value, together with releasing the restraint on the shutter opening means (for example, the first ring 101 of FIG. 8) of the shutter mechanism (not shown in FIG. 1); $R_6$ is a resistor to obtain a suitable bias; $Tr_3$, a transistor; E, a battery; $S_1$, main switch; and $S_4$, a sub-switch which is opened at least when the aperture setting ring is charged.

Next, the mode of operation of the first embodiment will be described. The shutter button 22 is depressed against the spring 23 after all preliminary operations required for photography have been accomplished so that the main switch $S_1$ is closed while the switch $S_2$ for short-circuiting the capacitor C is opened. The pin 25 causes the lever 19 to rotate in a counterclockwise direction against the spring 21 so that the lever is released from the projection 11 of the aperture ring 1. Consequently, the aperture ring 1 starts to rotate in a clockwise direction at a speed which is determined by the delay member 9 and the spring 14. Simultaneously, the sub-switch $S_4$ is closed. The rotation of the ring 1 causes the aperture blades 2 of a picture taking lens to open and also causes the light intensity adjustment blades 3 and 3' to open. The blades 3 and 3' are placed in front of the photoconductive element P' which serves to function as the second resistor. As soon as the switch $S_4$ is closed, the capacitor C is charged through the first photoconductive element P and the variable resistor $R_5$. A previously set shutter speed is set by the variable resistor $R_5$ or by varying a stop (not shown) placed in front of the first photoconductive element P.

The current charging the capacitor C varies by the first photoconductive element P and the variable resistor $R_5$; that is by the shutter speed set and the amount of light intercepted by the photoconductive element P. Therefore, the time required for the capacitor to reach a predetermined voltage may be determined as a function of the shutter speed and the intensity of light from a subject.

When the capacitor C is charged to a predetermined level, the current flows through a coil $M_1$ of the magnet $M_1$ so that the lever 17 is caused to rotate in a clockwise direction under the attracting force of the magnet $M_1$ against the spring 16. Consequently, the pawl 17' engages the saw teeth 13, thereby to prevent the rotation of the aperture ring 1.

Figure 5:
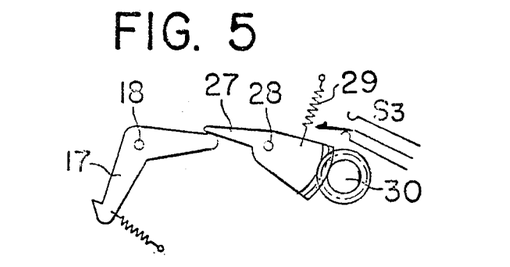
FIG. 5 is a schematic view illustrating a mechanical time delay device used in the first and second embodiments.

Upon rotation of the lever 17, the movable contact of the selection switch $S_3$ is connected to the fixed contact a for connection with the second photosensitive member P' and disconnected from the fixed contact b for connection with the first photoconductive element P. In order to charge the capacitor C to a reverse-breakdown voltage of the Zener diode D, there may be provided delaying members 27, 28, 29 and 30 between the lever 17 and the switch $S_3$, as shown in FIG. 5.

A shutter mechanism, not shown in FIG. 1, is concurrently actuated when the magnet $M_1$ is energized. This can be better explained by referring to the shutter mechanism shown in FIG. 8, wherein it is seen that when the restraint of the stopper 109 is released, simultaneously with the energization of the magnet $M_1$, the ring 101 begins to rotate to start opening the shutter. At this time, the switch $S_3$ (shown in FIGS. 1 or 2) has already been actuated and is in connection with the contact b by means of the magnet $M_1$ and the lever 17. This means that the time constant circuit, including a second photoconductive element P', is completed. Then, the capacitor C, already charged, discharges through the second photoconductive element P'. In front of the second photoconductive element P' is disposed aperture blades 3, 3' having a stop value corresponding to that of the aperture setting ring 2 of the projection lens, which is determined while the capacitor C is being charged. Accordingly, the resistive value of the second photoconductive element P' is determined by both factors, i.e., the amount of light impinged on the subject being photographed and the aperture value of the projection lens. The charge of the capacitor C is discharged through the photoconductive element P' having said value. When the charge of the capacitor C has dropped down to a predetermined value, the switching circuit ($Tr_1$, $Tr_2$) is reversed to energize the magnet $M_2$ and the shutter is thereby closed down. Again this is better explained by referring to FIG. 8, wherein it is seen that the magnet $M_2$ attracts the lever 110 to rotate the second ring 102 to thereby close the shutter.

Figure 6:
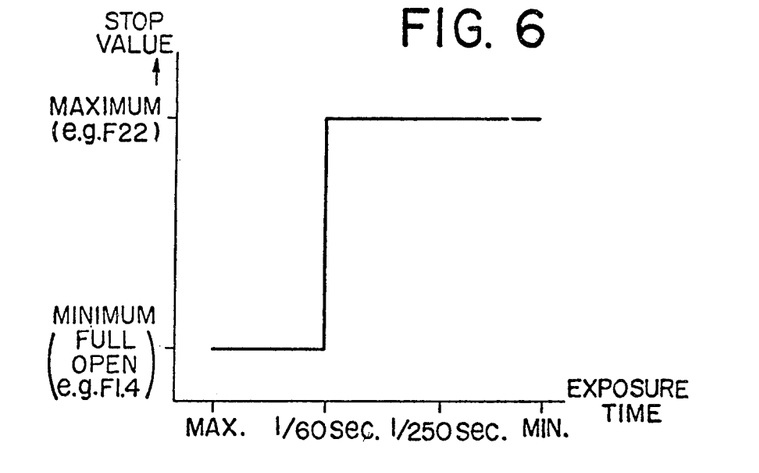
FIGS. 6 and 7 are program diagrams when a shutter speed is preselected to 1/60 and 1/250 seconds, respectively, in a programmed shutter followed shutter speed.
Figure 7:
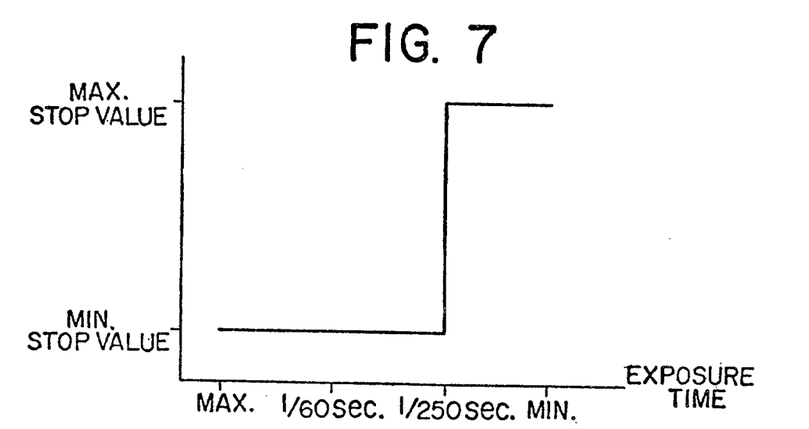

In the first emodiment described above, the charging time is varied in response to a shutter speed and intensity of light from a subject as shown in the program diagrams in FIGS. 6 and 7 so that the stops of the picture taking lens as well as the second photoconductive element may be maintained constant in response to a shutter speed. Next, the capacitor is discharged through the second photoconductive element so that a desired shutter speed may be obtained.

When the resistance of the second photoconductive element is lower than that set in response to a desired shutter speed, even when the stop value is set to the minimum because the pre-set shutter speed is too low for the intensity of light from a subject is too high, the shutter is, of course, released at a speed higher than the pre-set shutter speed in order to adjust the amount of exposure light.

On the other hand, when the resistance of the second photoconductive element is higher than that set in response to a desired shutter speed, even when the stop value is set to the maximum because the pre-set shutter speed is too fast or the subject is too dark, the shutter is released at a speed lower than the pre-set shutter speed.

Figure 3:
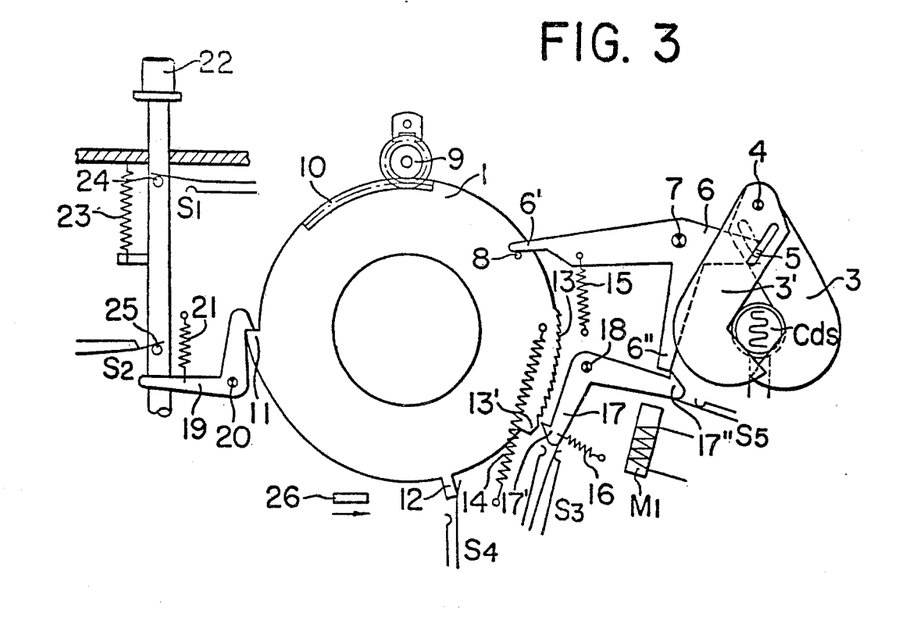
FIG. 3 is a schematic view illustrating structural parts of a second embodiment of the present invention.
Figure 4:
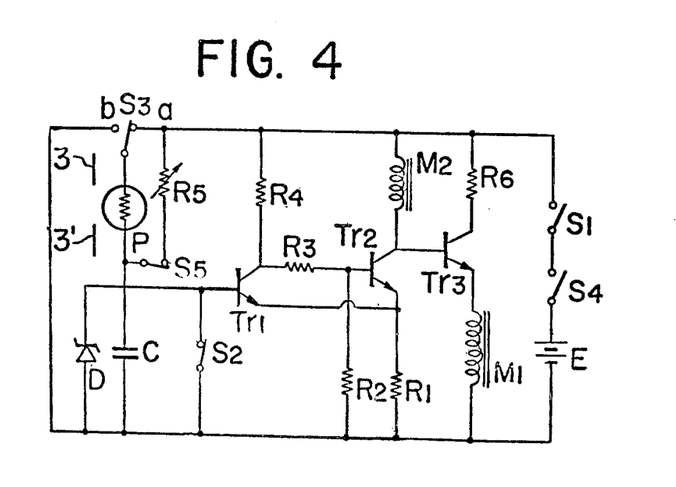
FIG. 4 is a circuit diagram of the second embodiment shown in FIG. 3.

SECOND EMBODIMENT, FIGS. 3 AND 4

FIGS. 3 and 4 illustrate the second embodiment in preparation for photography and the same parts are designated by the same reference numerals throughout FIGS. 1 - 4.

In the second embodiment, a timing circuit for determining an aperture or stop value is actuated while the stop A placed in front of the photoconductive element P is wide opened, and a discharge is made for determining a shutter speed while the stop is closed. Contrary to the first embodiment, the apertures of both the picture taking lens and the photoconductive elements are wide open. By releasing the lever 19, the aperture of the picture taking lens is first varied. When the pawl 17' of the lever 17 engages the saw teeth 13 upon energization of the magnet $M_2$, the pawl 17'' on the other end of the lever 17 is released from the arm 6'' of the lever 6 so that the latter is caused to rotate in a counterclockwise direction under the force of the spring 15 loaded between the camera body and the lever 6 until the leading end 6' engages with the pin 8. Thus, the blades 3 and 3' of the photoconductive element P may be rotated, thereby varying the stop. Simultaneously, the selection switch $S_3$ is switched and the switch $S_5$ is opened in order to disconnect the variable resistor $R_5$ in case of discharge.

The switches $S_3$ and $S_5$ are arranged so as to be actuated by the lever 6. Furthermore, the operation may be more stabilized by the delay device as shown in FIG. 5.

In the first and second embodiments, a coil is wound around the permanent magnet $M_1$ so that the attraction may be improved upon energization. After energization, the magnet $M_1$ attracts the lever 17 until the pawl 17' is pushed upwardly by the projection 13'. In such manner, the aperture may not be varied by the spring 14 when the shutter is being closed. After the shutter is actuated, the shutter button 22 is returned to its initial position by the spring 23 so that the switch $S_2$ is closed while the switch $S_1$ is opened.

When film is advanced, the lever 26 which coacts with the transportation mechanism of the film moves in the direction indicated so as to push the projection 12, thereby charging the aperture ring. In this case, the ring 1 is rotated slightly in a counterclockwise direction from the position shown in FIG. 3 so that the lever 19 engages the projection 11 while the projection 13' releases the lever 17 from the magnet $M_1$. In case of the charging, the lever 17 serves as a ratchet pawl relative to the saw teeth 13 so that the rotation of the ring 1 in a counterclockwise direction will not be prevented.

In the first and second embodiments described hereinabove, the structural elements for determining the aperture or stop value are controlled when the capacitor is charged and when the capacitor is discharged, the shutter speed is controlled.

Figure 9:
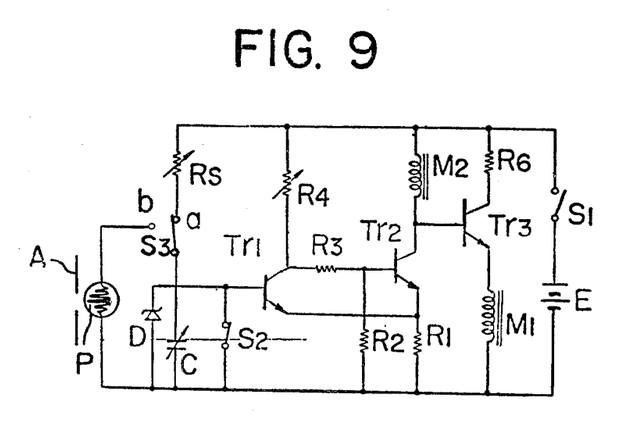
FIG. 9 is a circuit diagram of the third embodiment.
Figure 10:
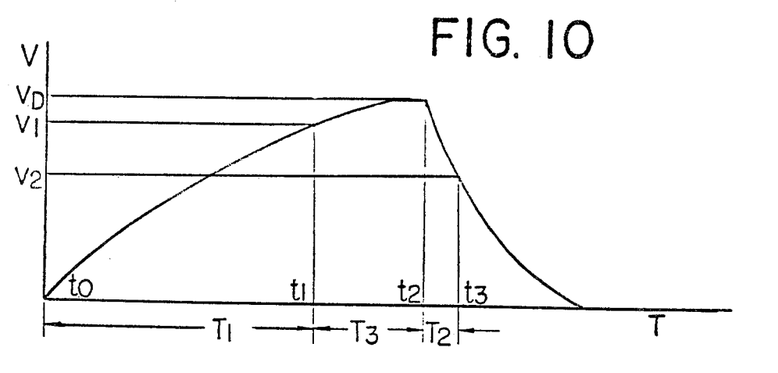
FIG. 10 is a graph illustrating the charging and discharge curves (time vs. voltage) of the capacitor used in the embodiment of FIG. 9.

THIRD EMBODIMENT, FIGS. 8 – 10

In brief, the third embodiment is such that an electronic self-timer is controlled by a capacitor charging circuit and an electronic shutter is controlled by a discharge circuit.

Referring to FIG. 8, first and second rings 101 and 102 are rotated in a clockwise direction under the force of springs 104 and 105, respectively. Reference numberal 103 designates a shutter which also functions as an aperture blade. A hook-shaped leading end 106a of a lever 106 engages a stepped portion 101b of the first ring 101, thereby preventing the rotation thereof. The lever 106 rotates about a shaft 108 in a clockwise direction under the force of a spring 107 whose one end is fixed to the other end of the lever 106. The rotation of the lever 106 may be stopped by a stopper 109. The electromagnet $M_1''$ attracts the lever 106 against the spring 107 when energized so as to release the first ring 101. A projection 101a extending from the periphery of the first ring 101 serves to control a selection switch $S_3$ in the charging and discharging circuits to be described in more detail hereinafter. The movable contact of the switch $S_3$ is normally in contact with a fixed contact $a$, but is forced into contact with a fixed contact $b$ by the projection 101a when the first ring 101 rotates. The projection 101a is angularly spaced apart from the switch $S_3$ by an angle of $\theta$ in order to provide a time lag $t_3$ to be described in more detail hereinafter. In this embodiment, mechanical governer mechanism is illustrated by G.

The hook-shaped leading end 110a of an engaging lever 110 is spaced apart from a stepped portion 102b the second ring 102 by a distance of $\delta$. The lever 110 has a spring 111, a shaft 112, and a pin 113. When energized, a magnet $M_2''$ causes the lever 110 to rotate in a counterclockwise direction. A shutter rod 114 which is normally biased upwardly under the force of a spring 115 has a pin 114a for making and breaking a power source switch $S_1$ and an annular groove 114b. When a pin 116 is dropped into the groove 114b, the switch $S_2$ is opened.

Referring to FIG. 9, two transistors $Tr_1$ and $Tr_2$ constitute a Schmidt circuit. A variable resistor $R_s$ is for setting a self-timer, and a shutter speed and/or a stop value are determined by a photoconductive element P. A capacitor C determines a time constant in charging in combination with the variable resistor $R_s$ and a time constant in discharging in combination with the photoconductive element P. The capacitor C is therefore selectively switched between the charging and discharging circuits. A first blind (first ring, etc.) is started by an electromagnet $M_1$ while a second blind (second ring, etc.) is started by an electromagnet $M_2$. The values of resistors $R_1$ and $R_4$ and $R_6$ may be suitably selected so that the Schmidt circuit may be suitably calibrated especially for temperature variation, sensitivity of films, etc. A switch $S_1$ is a start switch; $S_2$, a switch for short-circuiting the capacitor; $S_3$, the switch for selectively connecting the capacitor C to the charging or discharging circuit; and D, a constant voltage element such as a Zener diode, a constant voltage discharge tube, etc. A battery is designated by E; a transistor for driving the electromagnet $M_1$, by $Tr_3$; and a stop and/or shutter, by A.

Figure 11:
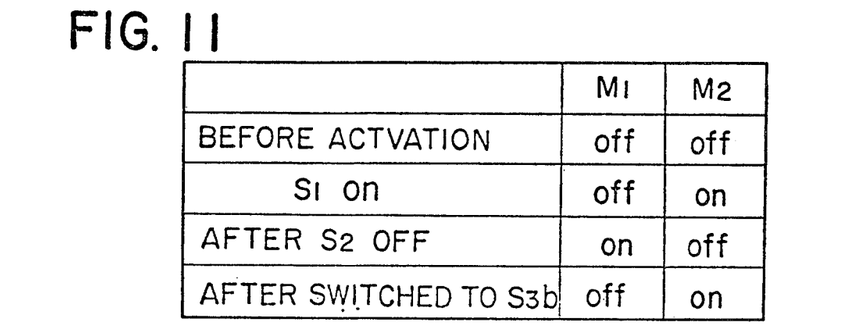
FIG. 11 is a table illustrating the energization and de-energization of two electromagnets used in the embodiment of FIG. 9 relative to the actuation of switches.

Next the mode of operation of the third embodiment of the present invention will be described in detail with reference to FIGS. 8 and 9. FIG. 10 illustrates the charging and discharging characteristics of the capacitor and FIG. 11 illustrates the mode of operation of magnets $M_1$ and $M_2$.

When the shutter is charged, as shown in FIGS. 8 and 9, the start switch $S_1$ is opened (OFF), the switch $S_2$ is closed (ON); and the selection switch $S_3$ makes contact with the fixed contact $a$. In this case, both of the magnets $M_1''$ and $M_2''$ are de-energized (OFF) as shown in the row of "Before Activation" in FIG. 11. Upon depression of the shutter rod 114 by one step, the switch $S_1$ is closed (ON) so that the electromagnet $M_2''$ is energized. In consequence, the locking lever 110 for locking the second ring 102 in position is caused to rotate in a counterclockwise direction against the spring 111 when attracted by the electromagnet $M_2''$. Thus, the hook-shaped leading end 110a of the lever 110 is released from the stepped portion 102b of the second ring 102. Since the projection 102a of the second ring 102 is in engagement with the pin 101c extending from the first ring 101, the second ring 102 is held in stationary position.

When the shutter rod 114 is depressed further, the pin 116, interconnected with the switch $S_2$, drops into the annular groove 114b of the shutter rod 114 so that the shutter rod 114 is prevented from returning to its initial position. In this position the switch $S_2$ is closed. Consequently, charging of capacitor C is initiated depending upon the value of the variable resistor $R_s$ for the self-timer. That is, the time set by the self-timer is counted and when the charged voltage across the capacitor C reaches a first predetermined voltage (On-Level) of the trigger circuit after a predetermined time $T_1$, the transistor $Tr_1$ is rendered conductive (ON) while the transistor $Tr_2$ is rendered non-conductive (OFF) and the transistor $TR_3$ is rendered conductive. Thus, the electromagnet $M_2''$ is deenergized while the electromagnet $M_1''$ is energized, so that the lever 106 is attracted against the spring 107. Therefore, the hook-shaped leading end 106a of the lever 106 is moved away from the passage of the stepped portion 101b of the first ring 101, and the latter starts to rotate.

In this case, the lever 110 is returned under the force of the spring 111 until it engages the stopper 113. Since there is provided a gap δ between the hook-shaped leading end 110a of the lever 110 and the stepped portion 102b of the second ring 102, the second ring 102 is prevented from rotating in unison with the first ring 101 because the hook-shaped leading end 110a of the lever 110 engages with the stepped portion 102b of the second ring 102.

Upon rotation of the first ring 101, the projection 101a of the first ring 101 causes the movable contact of the switch $S_3$ to make contact with the fixed contact b from the fixed contact a. Since the projection 101a is angularly spaced apart from the switch $S_3$ by θ, there may be provided a time $t_1$ required for increasing the voltage across the capacitor C to a reverse breakdown voltage Vd of the constant voltage element such as a Zener diode or the like.

When the switch $S_3$ is switched to the fixed contact b, the capacitor C is discharged through the resistor P' such as a photoconductive element so that the voltage across the capacitor reaches a second predetermined voltage level $V_2$ (Off-Level) of the trigger circuit after a predetermined time $T_2$. Consequently, the transistor $Tr_1$ is rendered non-conductive (OFF); the transistor $Tr_2$ is rendered conductive (ON); the transistor $Tr_3$ is rendered non-conductive; and the electromagnet $M_2''$ is energized. In such manner, the second ring 102 is started, thereby determining a shutter speed and/or aperture or stop value. Especially when the resistor is photoconductive element P' as in the case of the instant embodiment, a shutter speed and/or aperture or stop value may be automatically set in response to the brightness of a subject.

In the case of a camera with a TTL metering system and an automatic aperture pre-setting type mechanism, a real time photometering may be accomplished even when auxiliary light or flash light is used, so that the optimum amount of exposure light may be obtained in photography, In an alternative arrangement, a photoconductive element may be placed outside of the optical path of the light passing through the picture taking lens and a stop may be placed in front of this photoconductive element so as to set the sensitivity of film, etc.

The graph illustrated in FIG. 10 will be described in detail hereinafter. At $t_0$, the switch $S_2$ is opened; at $t_1$, the transistor $Tr_1$ is rendered conductive, transistor $Tr_2$, non-conductive and transistor $Tr_3$, conductive; at $t_2$, the switch $S_3$ is switched from the fixed contact a to the fixed contact b; and at $t_3$, transistor $Tr_1$ is rendered non-conductive, transistor $Tr_2$, conductive, and transistor $Tr_3$, non-conductive.

When the pin 116 is returned to its initial position after the second ring 102 is rotated, the shutter rod 114 is returned to its initial position. When the shutter is charged in unison with the film transport operation, the structural parts are all returned to their initial positions shown in FIGS. 8 and 9.

Even when a self-timer is incorporated in the camera, the operation of the electronic shutter is not adversely affected. Furthermore, when a plurality of photoconductive elements are used as the second resistor, the present invention may be also incorporated in a programmed shutter, a shutter followed diaphragm opening or shutter speed and the like. Furthermore, it may be possible to expand the dynamic range of the photosensitive element.

For instance, when no self-timer is incorporated in the camera, the value of the variable resistor Rs for the self-timer may be set to a small value so that the timer $T_1$ in FIG. 10 and accordingly the timer $T_3$ may be reduced. In consequence, upon depression of the shutter button, the transistor $Tr_1$ is immediately rendered conductive, transistor $Tr_2$, non-conductive and transistor $Tr_3$, conductive so that the element $M_1''$ is energized, thereby starting the first ring for exposure.

As is clear from the foregoing description, instead of the resistor $R_4$ in FIG. 8, a variable resistor may be used so as to vary the loop gain of the Schmidt circuit. Therefore, the variation in level of $V_1$ and $V_2$ may be used for conversion of the senitivity of film in a more practical manner.

Reference character G in FIG. 8 is a mechanical governor. In order to adjust the time $T_1 + T_2$ set by the self-timer, a non-contact selection switch may be used in such a manner that the bias current flowing through the constant voltage element may be used when the charged voltage across the capacitor C reaches the reference voltage $V_D$ so as to switch the movable contact of the switch $S_3$ from the fixed contact a to the fixed contact b.

In a third embodiment, independent charging and discharging circuits are provided in the imput circuit which employ a common capacitor and whose time constants may be varied independently so that two successive time controls may be accomplished by utilizing the time constants of the charging and discharging circuits. Thus, the self-timer is controlled by the charging characteristics, that is, the time constant of the charging circuit while the electronic shutter is controlled by utilizing the discharge characteristic, that is, the time constant of the discharge circuit. Furthermore, a photoconductive element may be used as a resistor in the discharge circuit and the trigger means may be used in common with the self-timer and electronic shutter. Those novel features of the present invention bring about various effects in practice.

Figure 12:
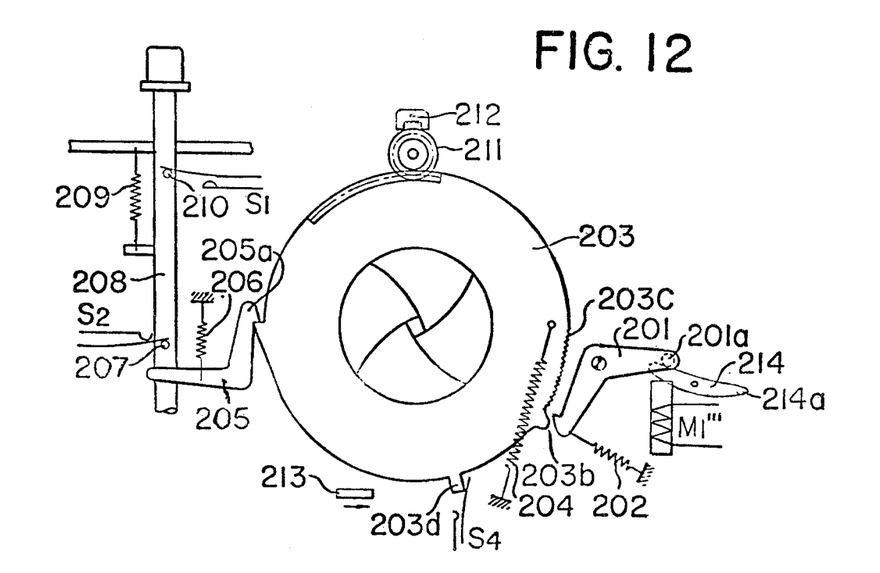
FIG. 12 and 14 are schematic views illustrating the structural parts of a fourth embodiment of the present invention.
Figure 13:
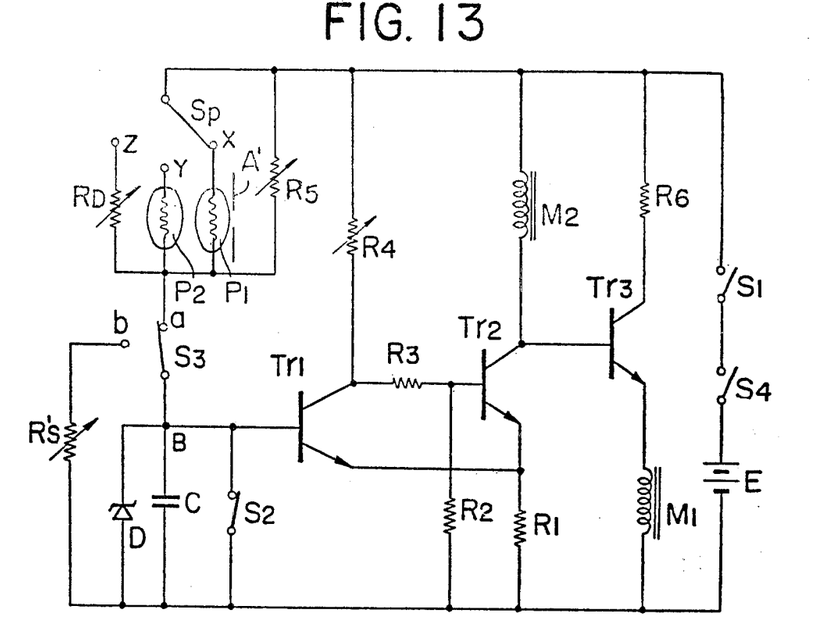
FIG. 13 is a circuit diagram of the fourth embodiment.

FOURTH EMBODIMENT, FIGS. 12 AND 13

Referring to FIG. 13, a switching circuit is a Schmidt circuit consisting of transistors $Tr_1$ and $Tr_2$. $P_1$ and $P_2$ are photoconductive elements whose $\gamma$ is representative of their characteristics of intensity of incidence light versus output current are for instance $\gamma_1 = 1$ and $\gamma_2 = 0.5$. $R_D$ is a variable resistor whose value may be varied in response to a range; C, a capacitor which determines the time constants in charging and discharging; $M_1'''$, a magnet coil for locking the aperture blades in position; $M_2'''$, a magnet coil for releasing the locked shutter closing mechanism; and $R_1$ to $R_4$ and $R_5$ are resistors whose values may be suitably selected so as to adjust the Schmidt circuit, especially for temperature compensation. Rs' designates a variable resistor for adjusting a shutter speed; $R_5$, a protective resistor; $S_1$; a start switch; $S_2$, a switch for short-circuiting the capacitor C; $S_3$ and $S_p$, selection switches; D, a constant voltage element such as a Zener diode, constant voltage discharge tube, etc.

Next, the mode of operation will be described with reference to FIGS. 12, 13 and 14. In case of photometering followed shutter speed, (that is, a desired shutter speed is preset and a suitable stop value in response to this shutter speed and intensity of light from a subject may be automatically determined), the selection switch Sp is switched to the contact X so that the photoconductive element $P_1$ with $\gamma=1$ may be used. A desired shutter speed is set at the variable resistor Rs' so that a stop for photometry A in front of the photoconductive element $P_1$ is opened in response to the actuation of the switch Rs' to an aperture corresponding to the shutter speed set.

When the shutter is charged, the switch $S_1$ is opened (OFF) and the switches $S_2$ and $S_3$ are closed. The switch $S_3$ is switched to the contact a. Upon depression of a shutter release button 207 by one step, the switch $S_2$ is opened and when the shutter release button 207 is further depressed, a lever 205 is rotated by a pin 207 against a spring 206 in a counterclockwise direction so that a hook-shaped end 205a of the lever 205 releases an aperture ring 203. The aperture ring 203 is caused to rotate in a clockwise direction under the force of a spring 204 and a projection 203d is moved away from the switch $S_4$ so that the latter is closed. Consequently, the capacitor C is charged with the current corresponding to the resistance of the photoconductive element $P_1$ which in turn corresponds to the intensity of light of the subject. That is, the time is counted. After a time $T_1$, the charged voltage across the capacitor C reaches an On-Level $V_1$ so that the transistor $Tr_1$ is rendered conductive, transistor $Tr_2$ non-conductive and transistor $Tr_3$ conductive. Therefore, the magnet $M_1$ is energized so as to attract a lever 201 so that a stop value corresponding to the pre-set shutter speed may be locked.

When the transistor $Tr_3$ is rendered conductive, that is, when the aperture is locked, lever 216 (FIG. 14) is rotated in a counterclockwise direction through a pin 201a, a lever 214 and a pin 214a so that a first ring 224 is released for exposure. A projection 224a is angularly spaced apart from the switch $S_3$ by $\theta$ so that the time $T_3$ in FIG. 10, required for the potential at point B reaching $V_D$ may be provided.

When the switch $S_1$ is ON, the electromagnet $M_2'''$ is energized, but the second ring 225 is locked by the engagement of its projection 225a with a pin 224c extending from the first ring 224 so that the second ring 225 will not rotate prior to the rotation of the first ring 224. When the potential at point B reaches $V_1$, the magnet $M_1'''$ is energized and the first ring 224 is started through the levers 201, 214 and 216. Since the stepped portion 225b of the second ring 225 is spaced apart by $\delta$ from the hook-shaped end of the lever 222, the lever 222 has already returned to its initial position for engagement with the second ring 225.

Upon rotation of the first ring 224, the projection 224a causes the movable contact of the switch $S_3$ to make contact with the fixed contact b so that the capacitor C is discharged through the resistor Rs'. When the potential at point B reaches an off-level $V_2$ after $T_2$ seconds, the transistor $Tr_1$ is rendered non-conductive, transistor $Tr_2$, conductive, a transistor $Tr_3$, non-conductive. Consequently, the electromagnet $M_2'''$ is energized, attracting the lever 222 so that the second ring 225 is released, thereby terminating the exposure. In other words, the switch $S_1$ is ON at $t_o$ in FIG. 10 so that the timing is started; at $t_1$, the magnetic $M_1'''$ is energized; at $t_2$, the movable contact of the switch $S_3$ is switched from the fixed contact a to the contact b; and at $t_3$, the electromagnet $M_2'''$ is energized, thus accomplishing the exposure.

It should be noted that the electromagnet $M_1'''$ comprises a permanent magnet and a coil wound therearound and is adapted to hold the lever 201 as long as it is forcibly released from the magnet $M_1''$ when the shutter is charged. For this purpose, as shown in FIG. 12, the teeth 203C of the aperture ring 203 and the lever 201 constitute a ratchet mechanism. The aperture ring 203 is charged in the direction indicated by the arrow by the charge lever 213.

The resistor $R_4$ in FIG. 13 may be a variable resistor so that the loop gain of the Schmidt circuit may be varied, thereby to vary the levels of $V_1$ and $V_2$ in FIG. 10 for the film sensitivity conversion.

In case of a programmed shutter, the selection switch Sp is switched to the contact Y so that the photoconductive element $P_2$ with $\gamma = 0.5$ may be utilized. The value of the variable resistor Rs' may be varied upon rotation of the aperture ring 203. The mode of operation is substantially similar to the shutter followed shutter speed described hereinabove. That is, at $t_1$ in FIG. 1, a stop value or aperture is set in response to the intensity of light from a subject; and time $t_3$ may be determined by the discharge through the resistor Rs' whose value is determined in response to the stop value so that a shutter speed is determined. A programmed shutter may be provided by discharging through the photoconductive element $P_2$ without using the resistor Rs'.

In case of flash-auto photography, the selection switch Sp is switched to the contact Z so that the resistor $R_D$ may be used. In this case, a shutter speed is set by the resistor Rs'. However, in the case of photography with the aid of a strobe, any suitable resistance may be used. In the case of bulb photography, a shutter speed of 1/30 sec. may be set. In these cases, a stop value in response to a range may be determined in a similar manner as described above, so that flash-auto photography is possible.

Figure 14:
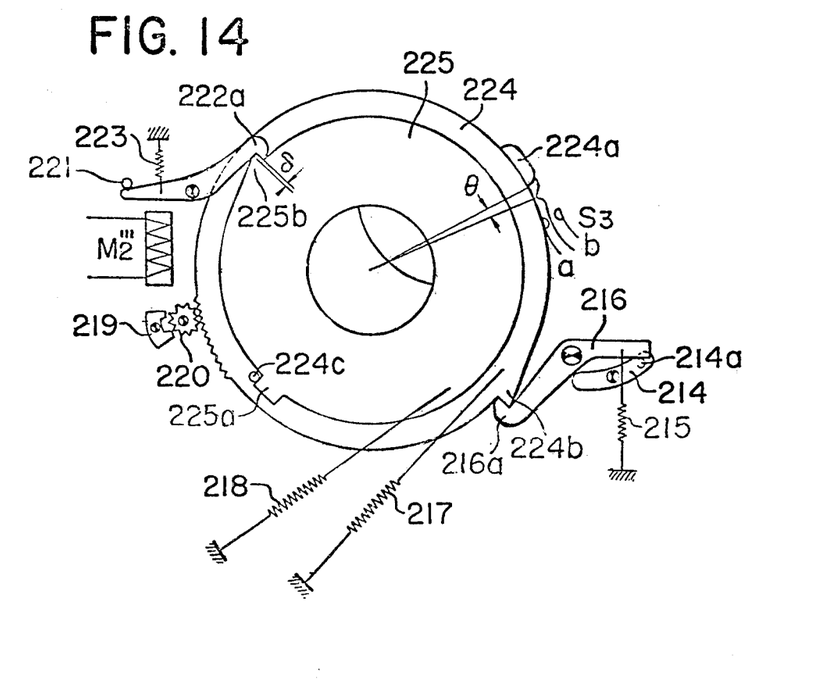

In FIGS. 12 and 14, reference numeral 202 designates a spring; 203b, a projection; 209, a spring; 210 a pin; 203a, a stepped portion; 211 and 212, a governer mechanism; 215, a spring; 216a, a pawl; 224b, a stepped portion; 217 and 218, springs; 219 and 220, a governer mechanism; 221, a pin extending from the camera body; and 223, a spring.

From the foregoing description, it is seen that the two successive time controls may be accomplished by one switching circuit and the RC charging and discharging circuits which have a common capacitor C, so that the exposure followed shutter speed or diaphragm opening may be easily controlled.

Furthermore, all of the exposure followed by shutter speed and diaphragm opening, programmed exposure and flash-auto exposure may be accomplished in a simple manner by using two photoconductive elements and a variable resistor.

Figure 15:
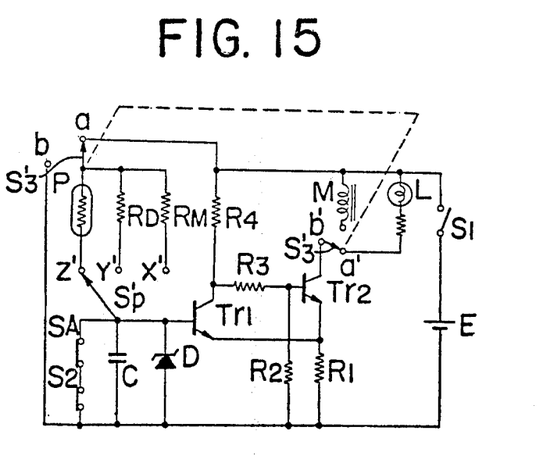
FIGS. 15 and 16 are circuit diagrams of the fifth and sixth embodiments of the present invention, respectively.

FIFTH EMBODIMENT, FIG. 15

Referring to FIG. 15, P designates a photoconductive element; $R_D$, a variable resistor interconnected with a range ring; $R_M$, a manually variable resistor having three fixed contacts $Z'$, $Y'$ and $X'$ one of which is selectively connected to point B, which in turn is connected to a capacitor C; D, a constant voltage element such as Zener diode, constant voltage discharged tube, or the like; $S_1$, a power source switch; $S_2$, a charging-start switch; and $S_3$ and $S_3'$, switches ganged or interlocked with each other for turning on a shutter speed indicator lamp in the case of charging and actuating a shutter control magnet M in the case of discharge. Alternatively, in the case of discharge, the shutter speed indicator lamp may be turned on while in the case of charging, the shutter control magnet may be actuated. A switching circuit may be a Schmidt circuit comprising transistors $Tr_1$ and $Tr_2$ and resistors $R_1$ to $R_4$. E is a power source; and $Sp'$ is a selection switch for selecting the fixed contact $Z'$ for EE Auto photography, the fixed contact $Y'$ for flash-auto photography and the fixed contact $X'$ for manual photography.

When the instant embodiment is incorporated in a single-lens reflex camera provided with an electronic shutter having a memory, the intensity of light from a subject is stored in the capacitor immediately before the mirror is retracted from the optical path, a shutter speed is previously indicated by the lamp; and the shutter is controlled by the discharge of the capacitor. In this case, however, the discharge is not accomplished correctly when the photoconductive element is placed in the optical path in the viewfinder system because the beam of light passing through the picture taking lens is prevented from being transmitted into the viewfinder system when the mirror is retracted for exposure. In this case, the discharge circuit may be designed as shown in FIG. 16 in order to overcome this problem.

Figure 16:
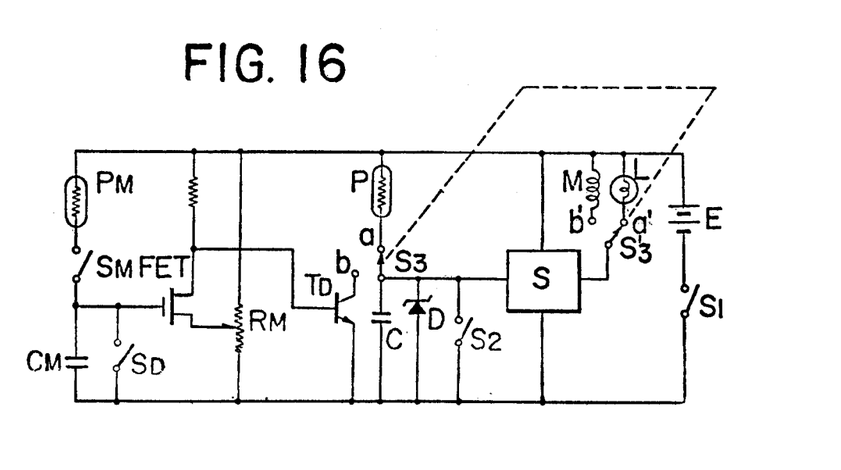

In FIG. 16, $P_M$ designated a photoconductive element for intercepting the light passing through the picture taking lens before the shutter is released; $C_M$, a capacitor which constitutes a time constant circuit in combination with the photoconductive element $P_M$; $S_M$, a switch actuated by the time constant circuit so as to be made for a predetermined time in order to memorize the intensity of the light passing through the picture taking lens; $S_D$, a switch for discharging the capacitor $C_M$; and FET, MOS field-effect transistor, which may be a combination of the conventional diode and transistor. The photoconductive element $P_M$ may be placed outside of the optical path of the light passing through the picture taking lens and in this case used as a resistor interconnected with an aperture setting ring or the like. The above described components constitute a memory means in an electronic shutter so that the value of the resistor in the discharge circuit may be varied in response to the intensity of light from a subject; and the intensity may be stored as a variation in internal resistance between the collector and emitter of the transistor $T_D$. A photoconductive element P placed backwardly of the picture taking lens will not intercept the light when a mirror is retracted from the optical path for exposure. D designates a Zener diode; C, a capacitor; $S_2$, charging start switch; L, a lamp; M, a magnet; and $S_3$ and $S_3'$, switches ganged or coacted with each other.

Next, the mode of operation will be described. When the selection switch $Sp'$ is connected to the contact $Z'$ and when the film is transported, the switch $S_1$ if OFF, switch $S_2$, ON and switch $S_3$ is made in contact with the fixed contact $a$ while switch $S_3'$, with the fixed contact $a'$. When the shutter release button is released by one step, the switch $S_1$ is ON; and switch $S_2$ is OFF so that the lamp L is turned on. The lamp L is turned off after a predetermined time $T_1$ in FIG. 10 depending upon a time constant determined by the photoconductive element P and the capacitor C. That is, the time $T_1$ is proportional to a controlled exposure time. When the shutter release button is depressed further, the switch $S_3$ is connected to the fixed contact $b$ while switch $S_3'$ to the fixed contact $b'$. The shutter is opened and the charged voltage $V_D$ across capacitor C is discharged through the photoconductive element C. After a time interval $T_2$ in FIG. 10, the magnet M is energized so that the shutter closing mechanism is actuated, thereby accomplishing the exposure.

It is preferable that the circuit is so designed as to satisfy the conditions of $t_1 = t_2$. Instead of the photoconductive element P, the a resistor $R_D$ or $R_M$ may be used. The mode of operation in case of a single-lens reflex camera provided with memory means is similar to that described above.

In order that EE auto-photography may be changed to flash-auto photography or so that a plurality of subjects may be exposed upon a single film frame after the film is transported and the shutter release button is depressed by one step, a switch $S_A$ may be connected in parallel with the capacitor C in addition to the charging start switch $S_2$. It is advantageous that this switch $S_A$ may be actuated from the exterior of the camera as a switch for indicating an exposure time. When the switch $S_2$ is so arranged that it may be made (ON) in response to the switching of the ganged switches $S_3$ and $S_3'$, the multi-exposure may be accomplished independently of the film transportation.

What is claimed is:

1. In a photographic camera in which both the aperture value of the picture taking lens and the exposure period of a shutter care controlled electromagnetically, the improvement comprising in combination:
   a. movable means for forming the aperture of the taking lens,
   b. a single electronic control circuit including photoelectric detector means responsive to intensity of light incident thereon, the light intensity corresponding to intensity of light incident on a photosensitive material through the taking lens, said photoelectric detector means having an output, electromagnetic means for controlling said movable means, and a signal generator means for applying a signal to said electromagnetic means in response to the output of the photoelectric detector means,
c. an exposure period presetting means for presetting a value, corresponding to the exposure period, into said single electronic control circuit,
d. a starter means for releasing the movable means for the aperture value control,
e. a shutter release means for releasing the shutter of the photographic camera after the completion of the controlling operation of the electromagnetic means, and
f. a switching means for switching the single electronic control circuit into a condition for controlling the exposure period of the shutter device in association with the shutter release means, the single electronic control circuit controlling the exposure period of the shutter device after the aperture setting of the aperture device in response to the light intensity on the photoelectric detector means.

2. The improvement as claimed in claim 1 wherein the shutter release means is associated with said electromagnetic means to be driven after the completion of the controlling operation of the electromagnetic means.

3. The improvement as claimed in claim 1 wherein the single electronic control circuit further includes a distance setting means for setting an object distance.

4. The improvement as claimed in claim 1 wherein an exposure period is determined corresponding to the light intensity after the aperture setting of the aperture device is performed.

5. The improvement as claimed in claim 1 wherein the aperture value control and the exposure period control are performed with the aid of a single capacitor respectively under charging and discharging.

* * * * *

UNITED STATES PATENT OFFICE

CERTIFICATE OF CORRECTION

Patent No. 3,903,529          Dated   September 2, 1975

Inventor(s)   KANEHIRO SORIMACHI, ET AL.

It is certified that error appears in the above-identified patent and that said Letters Patent are hereby corrected as shown below:

Column 2, line 8, "inventor" should read --inventors--;

Column 2, line 25, "simaltaneously" should read --simultaneously--;

Column 3, line 34, "to" should read --at--;

Column 3, line 45, "Fig." should read --Figs.--;

Column 3, line 58, "aperture blades; and" should read --aperture blades--;

Column 3, lines 58 and 59, " 3', aperture blades placed" should read --3' placed--;

Column 4, line 17, "tht" should read --that--;

Column 4, line 51, "which is appeared" should read --which appears--;

Column 6, line 38, "emodiment" should read --embodiment--;

Column 6, line 50, "minimum" should read --minimum,--;

UNITED STATES PATENT OFFICE
CERTIFICATE OF CORRECTION

Patent No. 3,903,529         Dated September 2, 1975

Inventor(s) KANEHIRO SORIMACHI, ET AL.

It is certified that error appears in the above-identified patent and that said Letters Patent are hereby corrected as shown below:

Column 6, line 51, "for" should read --or--;

Column 7, line 4, "wide-opened" should read --wide-open--;

Column 7, lines 59 and 60, "numberal" should read --numeral--;

Column 8, line 13, "governer" should read --governor--;

Column 8, lines 16 and 17, "102b" should read --102b of--;

Column 9, line 19, "TR$_3$" should read --Tr$_3$--;

Column 9, line 20, "M2' ' " should read --M$_2$' '--;

Column 9, line 55, "is" should read --is a--;

Column 10, line 40, "senitivity" should read --sensitivity--;

Column 10, line 66, "Those" should read --These--;

UNITED STATES PATENT OFFICE
CERTIFICATE OF CORRECTION

Patent No. 3,903,529     Dated September 2, 1975

Inventor(s) KANEHIRO SORIMACHI, ET AL.

It is certified that error appears in the above-identified patent and that said Letters Patent are hereby corrected as shown below:

Column 12, line 65, "governer" should read --governor--;

Column 13, line 1, "governer" should read --governor--;

Column 13, line 52, "designated" should read --designates--;

Column 14, line 35, "the a" should read --the--;

Column 14, line 54, Claim 1, "the picture" should read --a picture--;

Column 14, line 55, Claim 1, "care" should read --are--.

Signed and Sealed this seventeenth Day of February 1976

[SEAL]

Attest:

RUTH C. MASON
*Attesting Officer*

C. MARSHALL DANN
*Commissioner of Patents and Trademarks*